Figure 1:
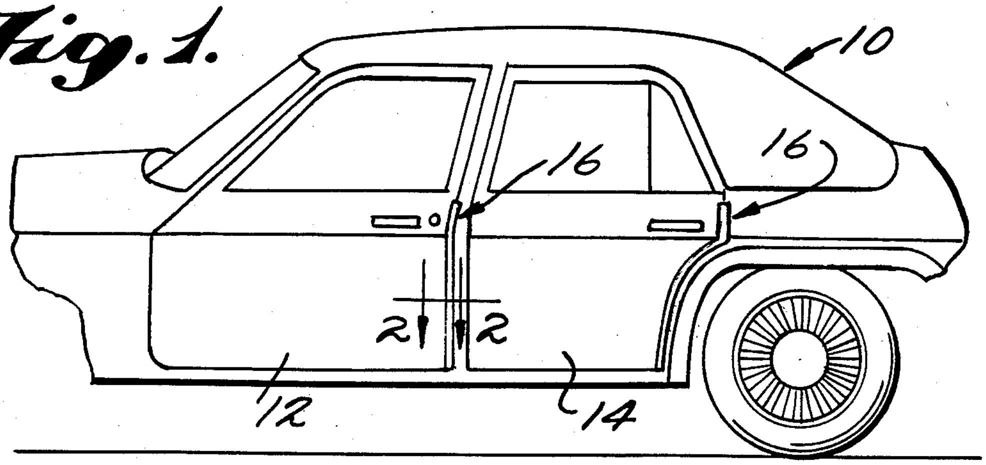

United States Patent [19]

McKinnon et al.

[11] Patent Number: 4,555,870

[45] Date of Patent: Dec. 3, 1985

[54] DOOR EDGE GUARD TRIM

[75] Inventors: Greg E. J. McKinnon, Barrie; Arthur J. Hoke, Brampton, both of Canada

[73] Assignee: Magna International, Inc., Ontario, Canada

[21] Appl. No.: 525,472

[22] Filed: Aug. 22, 1983

[51] Int. Cl.[4] .................................................. B60J 5/00

[52] U.S. Cl. .......................................... 49/462; 52/716; 52/823

[58] Field of Search ..................... 49/462; 52/716, 823; 428/31, 122, 358

[56] References Cited

U.S. PATENT DOCUMENTS

| | | | |
|---|---|---|---|
| 3,545,157 | 12/1970 | Cziptschirsch et al. | 49/462 X |
| 3,547,516 | 12/1970 | Shanok et al. | 49/462 X |
| 4,259,812 | 4/1981 | Adell | 49/462 |
| 4,338,148 | 7/1982 | Adell | 49/462 X |
| 4,365,450 | 12/1982 | Adell | 49/462 X |
| 4,379,376 | 4/1983 | Adell | 49/462 |
| 4,379,377 | 4/1983 | Adell | 49/462 |

*Primary Examiner*—Philip C. Kannan
*Attorney, Agent, or Firm*—Cushman, Darby & Cushman

[57] ABSTRACT

An edge guard trim for an automobile door edge or the like comprising a sheet metal strip roll formed into a generally U-shaped cross-sectional configuration so as to provide a bight portion and a pair of leg portions extending therefrom terminating in free ends. The free ends of the leg portions are rounded off at least along their inner corners. An extrudable thermoplastic insulating material is extruded in covering relation to the free ends of the leg portions in sufficient quantity to enable the metal strip to be installed on a door edge in scratch free fashion and in covering relation to the interior surfaces of the leg portions and bight portion in sufficient quantity to provide a desired insulation between the metal strip and the door edge during use. The exterior surfaces of the leg portions and the bight portion are smooth and free of insulating material so as to present an exposed metallic visual appearance.

19 Claims, 3 Drawing Figures

DOOR EDGE GUARD TRIM

This invention relates to automotive trim and more particularly to trim of the door edge guard type.

The edge guard trim utilized on automobile doors has for many years been formed from a strip of sheet metal roll formed into a generally U-shaped cross-sectional configuration in which the free ends of the legs of the U-shaped cross-sectional configuration are bent back onto themselves in an inward direction to provide beads presenting relatively smooth end edges on the legs of the trim itself. In recent years, it has been found desirable to provide insulation between the interior of the beaded U-shaped trim and the exterior of the door edge upon which the trim is mounted.

In an early proposal contained in the patented literature to provide such insulation (U.S. Pat. No. 4,259,812), the insulation is separately extruded of an appropriate insulating material, such as vinyl plastic, in a configuration conforming to the interiorly beaded U-shaped configuration of the metal trim. The separately formed insulation strip is then assembled with the metal trim in its final form. A problem presented with respect to this proposal is the securement of the two separately formed strips together.

A later proposal disclosed in U.S. Pat. No. 4,338,148 is to utilize plastic film as the insulation and to effect at least partial bonding of the film to the metal strip before the metal strip had been completely roll formed into its final configuration. In a first disclosed embodiment, the film is completely bonded prior to the formation of the inwardly bent beads. The subsequent formation of the beads resulted in the insulation being disposed within the bead rather than between the bead and door edge. In another disclosed embodiment the film is initially completely bonded to the metal trim prior to the formation of the beads so as to cover not only the interior of the bight and legs of the trim but to extend over the free ends of the legs to the exterior thereof. In this way, when the leg ends are finally bent inwardly, the portions of the film originally bonded to the exterior portions of the leg ends are in an inward position between the beads and the door edge. In another disclosed embodiment, the film is initially only partially bonded to the bight of the trim and then after the leg ends are bent inwardly to form the beads, the remainder of the film is secured to the interior of the inwardly bent beads. See also related U.S. Pat. No. 4,365,450 where in addition to the above the film is initially mounted on the door edge and the metal trim subsequently mounted thereover. In all of these film arrangements, including the further arrangement in the last mentioned patent where after the formation of the beads the film is secured not only over the interior of the beads but is wrapped around the exterior of the bead as well, the securement of the film to the metal becomes the limiting factor. In order to overcome the securement problem, an initial laminate is formed and then the laminate is roll formed into the final configuration. In order to avoid the non-insulating problem of the first mentioned embodiment of U.S. Pat. No. 4,338,148 where the insulation is interior of the subsequently formed bead, the bead is formed by bending the laminate outwardly so that the bead is exteriorly oriented. To minimize the visual effect and provide a measure of protection for the exteriorly bent over edge extremities of the beads, the remainder of the legs are exteriorly offset. Such a construction, which is utilized commercially, is disclosed in recently issued U.S. Pat. No. 4,379,377.

While the door edge guard trim formed of a laminate with exterior beads is a commercial arrangement, the necessity to include in the final trim exterior portions of insulation material prevents the presentation of a smooth all-metal suface as the visual effect. Moreover, these exterior portions of insulating material present the possibility of delamination during aging and use. Consequently, there still exists a need for an insulating trim strip which provides all the advantages of the present commercially acceptable arrangement while at the same time eliminating the noted disadvantages thereof.

An object of the present invention is the provision of a door edge guard trim which fulfills the need described above. In accordance with the principles of the present invention, this objective is achieved by effecting the securement between the metal strip and the insulating material after the metal strip has been completely roll formed by extruding the insulating material over the end edges of the legs of the formed metal strip in sufficient quantity to insure scratch free installation and along the interior surface thereof in sufficient quantity to insure insulation during extended use leaving the entire exterior surface of the metal strip exposed to present a smooth metallic visual effect which is not subject to delamination. The extrusion of the insulation material onto the metal strip in its final form enables a type of bond to be formed between the insulating material and the metal which is superior even to a laminated bond. Since the insulating material can be brought into engagement with the metal sufface under elevated temperatures within the melting range not only can a more intimate bond be accomplished, but by suitably preparing the metallic surface, a chemical bonding action can be achieved in addition to a mechanical bond of the type which is made by a lamination procedure. The improved bond achieved insures that there is adequate insulating material at the free ends of the legs to accomplish installation of the trim strip on the door edge without scraping the door edge paint. Once installed, there is adequate material firmly bonded to the interior surface of the metal strip to provide the desirable insulation needed.

While it is within the broadest aspects of the present invention to extrude the insulating material on the free ends of the legs of a conventional inwardly beaded metal strip and along the interior surface thereof so as to leave the smooth metallic exterior surface thereof exposed, a salient feature of the present invention resides in the discovery that the answer to providing an effective insulated door edge guard trim is not just in achieving a more effective bond between the insulating material and the metal strip, but in recognizing that the excellent bond provided by extruding the insulating material on the already roll formed metal strip makes it possible to achieve effective final trim configurations exposing the smooth exterior metallic surface which cannot be achieved where bonding takes place either totally as a laminate or partially before roll forming of the metal strip is completed or a separate mechanical securement is achieved during installation. Thus instead of viewing the solution in terms of how to best add the insulation material to a conventional beaded trim strip, by following the principles of the present invention it is possible to eliminate the beads of the conventional metal trim strip and to roll form a narrower metal strip (thus effecting a significant metal material saving) into a U-shaped cross-sectional configuration in which the free ends of the legs are defined by coined metallic edges. After the metal strip has been roll formed into this configuration, the insulating material is extruded thereon so as to cover the coined edges sufficiently to enable scratch free installation and the interior surfaces sufficiently to provide insulation during use. It is important to at least chamfer or round-off by coining the inner corners of the end edges so that the tendency of the sharp corners to cut through the covering vinyl insulating material during installation is minimized. Preferably, the outer corners of the end edges are chamfered or rounded-off by coining as well as the inner corners to aid in establishing an effective bonding seam.

Another object of the present invention is the provision of a door edge guard trim which is simple in construction, effective in operation and economical to manufacture.

These and other objects of the present invention will become more apparent during the course of the following detailed description and appended claims.

The invention can best be understood with reference to the accompanying drawings wherein an illustrative embodiment is shown.

Figure 2:
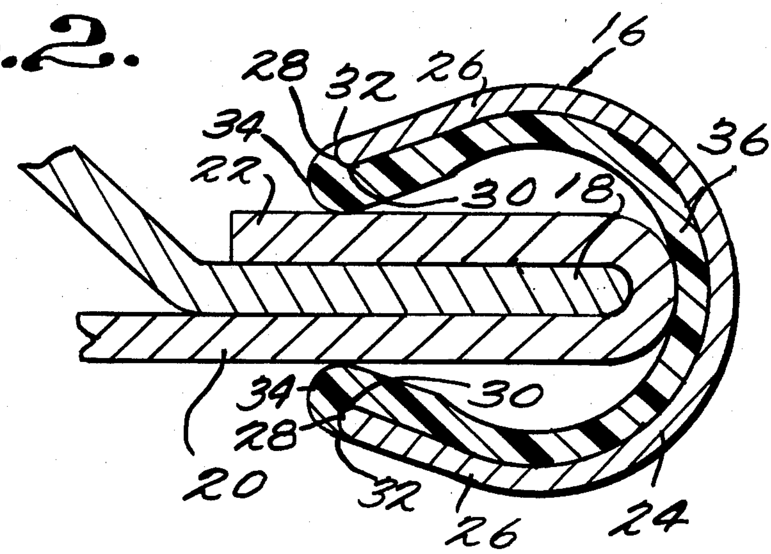
Figure 3:
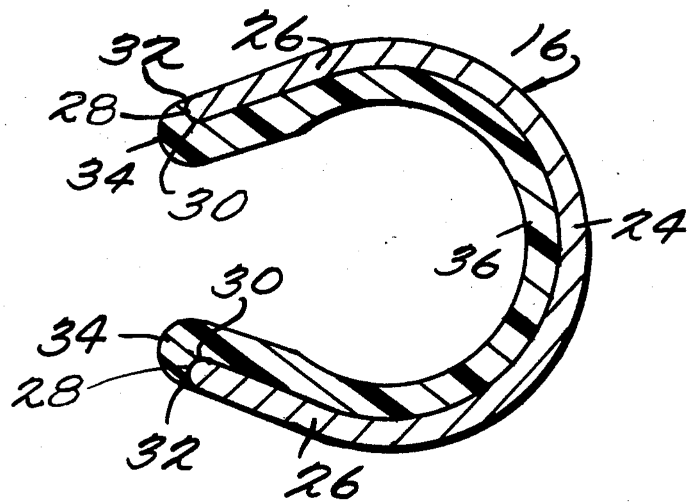

In the drawings:

FIG. 1 a fragmentary side elevational view of an automobile having doors to which has been applied door edge guard trim constructed in accordance with the principles of the present invention, FIG. 2 is an enlarged fragmentary sectional view taken along the line 2—2 of FIG. 1; and FIG. 3 is a sectional view of the door edge guard trim prior to installation on the door edge structure.

Referring now more particularly to FIG. 1 of the drawings, there is shown therein an automobile, generally indicated at 10, which is a typical 4-door sedan, including a pair of front doors 12 and a pair of rear doors 14. It will be understood that the automobile 10 shown in the drawings is merely exemplary to illustrate a typical installation of a door with door edge guard trim, generally indicated at 16, constructed in accordance with the principles of the present invention. In FIG. 1, the door edge guard trim 16 is shown applied to the free edge construction of both the front doors 12 and the rear doors 14. FIG. 2 illustrates a typical door edge cross-sectional construction which includes an inner sheet metal member 18 and an outer sheet metal member 20, which is wrapped around the inner sheet metal member 18, as indicated at 22, to provide a three-ply door edge construction.

The door edge guard trim 16 is, in accordance with conventional practice, initially constructed in strips of uniform cross-sectional configuration and then the strips are appropriately bent so as to conform with the configuration of the door edge construction. In accordance with the principles of the present invention the door edge guard trim 16 is formed of a sheet metal strip which is roll formed into a generally U-shaped cross-section configuration so as to provide a bight portion 24 and a pair of leg portions 26 extending therefrom and terminating in free ends 28. As shown, the bight portion 24 is of arcuate cross-sectional configuration and has an arcuate extent of approximately 128°. The leg portions 26 extend tangentially from the ends of the bight portion and converge toward one another, preferable at an included angle of approximately 38°.

The free ends 28 of the leg portions 26 have their inner corners chamfered or rounded off, as indicated at 30, preferably by coining during the roll forming of the metal strip into the U-shaped cross-section configuration. Similarly, the free ends 28 of the leg portions 26 have their outer corners chamfered or rounded off, as indicated 32, preferably by coining during the roll forming of the metal strip into the U-shaped cross-sectional configuration thereof. While any suitable metal material may be utilized as the sheet metal strip from which the U-shaped configuration is roll formed, a preferred metal material is stainless steel of a thickness of between 0.38 to 0.43 millimeters thickness (SAE 51434).

The door edge guard trim 16 of the present invention also includes an extrudable thermoplastic insulating material which is extruded with portions 34 in covering relation to the free ends 28 of the leg portions 26 in sufficient quantity to enable the metal strips to be installed on a door edge in scratch-free fashion. As shown the insulating material portions 34 which cover the free ends 28 have an arcuate cross-sectional configuration. Preferably, the arcuate configuration has a radius of approximately 0.5 millimeters. The insulating material also includes a portion 36 extruded in covering relation to the interior surfaces of the leg portions 26 and bight portion 24 of the metal strip in sufficient quantity to provide a desired insulation between the metal strip and the door edge during use. The portions 34 and 36 may likewise be formed of any suitable extrudable thermoplastic material, such as a vinylresin, preferably polyvinyl chloride. Since the polyvinyl chloride material is extruded into covering relation with the metal strip as aforesaid, there is provided not only a mechanical bond between the plastic material of the insulation and the metal material of the strip but, by suitably preparing the surface of the metal prior to the extrusion covering, an intimate chemical bond is provided as well. The thickness of the insulating material covering the leg portions 26 and the bight portion 24 is preferably within the range of 0.50 and 0.62 millimeters.

It will also be noted that the configuration of the door edge guard trim 16 prior to installation is such that the insulation portions 34 covering the free ends 28 of the metal strip are spaced apart slightly less than the 3-ply thickness of the door edge so that when the door edge guard trim 16 is installed over the door edge guard construction as shown in FIG. 2, the inherent resiliency of the leg portions 26 of the metal strip serve to resiliently grip the door edge and retain the edge guard trim 16 in operative position thereon as shown in FIGS. 1 and 2.

It will be noted that the end portions 34 of the insulating material insures that the installation will take place without scratching the paint on the door edge. Moreover, the chamfered or rounded off inner corners 30 of the free ends 28 of the metal strip insure that the metal will not cut through the thickness of the insulation material covering the same during installation. The end portions 34 of the insulating material which engage opposite surfaces of the door edge and the portion 36 of insulating material covering the bight portion 24 which engages the door edge extremity serve to insulate the metal strip from the metal door and prevent any galvanic corrosion from occurring. It is of significance to note that with the construction of the trim 16 in accordance with the principles of the present invention the exterior surfaces of the leg portions 26 and the bight portion 24 of the U-shaped metal strip are smooth and free of insulating material so as to present an exposed metallic visual appearance. If desired the insulating material 36 may also be pigmented or colored to simulate a metallic appearance at the free ends 28.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. An edge guard for an automobile door edge or the like comprising a sheet metal strip roll formed into a generally U-shaped cross-sectional configuration so as to provide a bight portion and a pair of leg portions extending therefrom terminating in free ends, one of said pair of leg portions constituting an exterior leg portion for guarding the exterior of the door edge, said exterior leg portion being of uniform one ply thickness, the free end of said exterior leg portion being defined by the edge of the one ply thickness of said exterior leg portion and an extrudable thermoplastic insulating material extruded in covering relation to the interior surfaces of said leg portions in sufficient quantity to enable the metal strip to be installed on a door edge in scratch free fashion and in covering relation to the interior surface of the bight portion in sufficient quantity to provide a desired insulation between the metal strip and the door edge during use, said extrudable thermoplastic insulating material being extruded in covering relation to the free end of said exterior leg portion, the exterior surfaces of said exterior leg portion and said bight portion being smooth and free of insulating material so as to present an exposed metallic visual appearance.

2. An edge guard trim as defined in claim 1 wherein said bight portion is arcuate and said leg portions are straight and converge toward one another in the direction of their free ends.

3. An edge guard trim as defined in claim 2 wherein said leg portions converge toward one another along an included angle of approximately 38°.

4. An edge guard trim as defined in claim 3 wherein said bight portion extends arcuately through an angle of approximately 128°.

5. An edge guard trim as defined in claim 2 wherein the inner corners of the free ends of said leg portions are rounded off by coining during the roll forming of the metal strip into the U-shaped cross-sectional configuration.

6. An edge guard trim as defined in claim 5 wherein the outer corners of the edges of said leg portions are also rounded off by coining during the roll forming of the metal strip into the U-shaped cross-sectional configuration.

7. An edge guard trim as defined in claim 5 wherein said metal strip has a thickness within the range of 0.38 to 0.43 millimeters and said insulating material has a thickness within the range of 0.50 to 0.62 millimeters.

8. An edge guard trim as defined in claim 7 wherein the free ends of said leg portions are covered by insulating material having an arcuate cross-sectional configuration.

9. An edge guard trim as defined in claim 8 wherein the arcuate configuration of the insulating material covering the free ends of said leg portions has a radius of approximately 0.5 millimeters.

10. An edge guard trim as defined in claim 1 wherein said leg portions are of uniform one ply thickness, the free ends of said leg portions being defined by the edges of the one ply thickness of said leg portions with the inner corners thereof rounded off by coining during the roll forming of the metal strip into the U-shaped cross-sectional configuration.

11. An edge guard trim as defined in claim 10 wherein the outer corners of the edges of said leg portions are also rounded off by coining during the roll forming of the metal strip into the U-shaped cross-sectional configuration.

12. An edge guard trim as defined in claim 11 wherein said extrudable thermoplastic material is polyvinyl chloride and said metal is stainless steel.

13. In an automobile including a door having a free edge and an edge guard trim mounted over the free edge of said door, the improvement which comprises said edge guard trim comprising a sheet metal strip roll formed into a generally U-shaped cross-sectional configuration so as to provide a bight portion and a pair of leg portions extending therefrom terminating in free ends, said leg portions being of uniform one ply thickness, the free ends of said leg portions being defined by the edges of the one ply thickness of said leg portions, and an extrudable thermoplastic insulating material extruded in covering relation to the free ends of said leg portions in sufficient quantity to enable the metal strip to be installed on a door edge in scratch free fashion and in covering relation to the interior surfaces of said leg portions and bight portion in sufficient quantity to provide a desired insulation between the metal strip and the door edge during use and a gripping engagement over the free edge of said door with the leg portions applying gripping pressure thereto, the exterior surfaces of said leg portions and said bight portion being smooth and free of insulating material so as to present an exposed metallic visual appearance.

14. The improvement as defined in claim 13 wherein said bight portion is arcuate and said leg portions are straight and converge toward one another in the direction of their free ends.

15. The improvement as defined in claim 14 wherein the inner corners of the free ends of said leg portions are rounded off by coining during the roll forming of the metal strip into the U-shaped cross-sectional configuration.

16. The improvement as defined in claim 15 wherein the outer corners of the edges of said leg portions are also rounded off by coining during the roll forming of the metal strip into the U-shaped cross-sectional configuration.

17. The improvement as defined in claim 13 wherein said leg portions are of uniform one ply thickness, the free ends of said leg portions being defined by the edges of the one ply thickness of said leg portions with the inner corners thereof rounded off by coining during the roll forming of the metal strip into the U-shaped cross-sectional configuration.

18. The improvement as defined in claim 17 wherein the outer corners of the edges of said leg portions are also rounded off by coining during the roll forming of the metal strip into the U-shaped cross-sectional configuration.

19. The improvement as defined in claim 18 wherein said extrudable thermoplastic material is polyvinyl chloride and said metal is stainless steel.

* * * * *